United States Patent [19]
Paton et al.

[11] Patent Number: 5,779,002
[45] Date of Patent: Jul. 14, 1998

[54] ASTRONAUT'S WORK STATION DEVICE

[75] Inventors: Boris E. Paton; Valeri A. Kryukov; Sergei S. Gavrish; Alexandr R. Bulatsev; Vladimir V. Demyanenko; Alexandr A. Zagrebelnii, all of Kiev, Ukraine; Alexandr V. Markov, Chelyuskinskii town, Russian Federation; Boris L Perepechenko, Kiev, Ukraine; Mikhail J. Moreinis, Kiev, Ukraine; Igor G. Lubomudrov, Kiev, Ukraine

[73] Assignee: The E.O. Paton Electric Welding Institute of the National Academy of Sciences of Ukraine, Kiev, Ukraine

[21] Appl. No.: 599,972

[22] Filed: Feb. 14, 1996

[30] Foreign Application Priority Data

Feb. 14, 1995 [UA] Ukraine ............................... 95020653

[51] Int. Cl.$^6$ ................................................. B66F 11/04
[52] U.S. Cl. ........................ 182/222; 182/63; 182/2; 182/129
[58] Field of Search ............................ 182/36, 37, 38, 182/39, 222, 113

[56] References Cited

U.S. PATENT DOCUMENTS 644,048  2/1900  Andre ........................ 182/38 X
5,070,964  12/1991  Monford, Jr. .............. 182/129 X

OTHER PUBLICATIONS

"Nauka I Zizhn" Journal, #2, 1986.

"Engineering Psychology in Aviation and Cosmonautics" Achinostrojenie, 1972, pp. 224–225.

Primary Examiner—Alvin C. Chin-Shue
Assistant Examiner—Long Dinh Phan
Attorney, Agent, or Firm—Mark R. Wisner; Daniel N. Lundeen

[57] ABSTRACT

An astronaut's work station for performing experiments or other work in space is designed for use under the conditions of open space on board space vehicles by an astronaut in a spacesuit, using a system of hardware, for instance electron beam, which it accommodates, as well as samples of materials to be worked on, located in a replaceable samples module. The work station is fastened on the outer surface of a long-term orbital space station of the MIR type, or in the cargo bay of a cargo reusable space vehicle of the Shuttle type. The work station comprises a frame containing a base with a foot rail, a hand rail with a holder, a seat with latches for locking-in the replaceable samples module, and an astronaut's sliding foot restraint which moves over the foot rail.

7 Claims, 10 Drawing Sheets

ASTRONAUT'S WORK STATION DEVICE

FIELD OF THE INVENTION

This invention pertains to support equipment which is mounted on board space vehicles in open space, and more specifically to a work station for performing experiments and other work in space. The apparatus is designed to be fastened on an outer surface of, for example, a long-term orbital space station of the MIR type or in the cargo bay of a reusable cargo vehicle of the Shuttle type. The invention can be used when the astronaut is in a spacesuit performing experiments, investigating technologies and materials, and doing other work.

BACKGROUND OF THE INVENTION

One of the important problems in space exploration is human body movement in space under zero-g conditions. The absence of gravitational forces significantly changes the coordination and nature of a human's movements in interaction with the surrounding objects, causes readjustment of many of the habitual movements, and redistribution of muscular forces. Well-developed mechanisms for coordinating movements are required to be capable of making purposeful actions and performing work operations.

To broaden the astronaut's functions in open space, there arose the problem of creating work station devices with controls for displacement, braking, rotations and fixation of the astronaut's feet. Here, because of the difficulties of manipulating regular handles, it was necessary to develop devices with push-button control.

A device for fastening the feet is known which locks the astronaut and enables his performance under open space conditions (see "Nauka I Zizhn" Journal, #2, 1986). This device incorporates astronaut mobile foot restraints made in the form of an anchor footplate with special stationary support platforms for the feet with cramps adjusted in advance by height. The cramps lock the toes of the spacesuit boot. In addition, the boot heel has a spur for which the device carries a special seat with a latch. This device can be mounted both inside and outside of the space vehicle for working with various instruments and hardware.

Such a device is not effective in open space conditions since it does not have any means for replacing samples under study or the capability of an astronaut's displacement along the working envelope. In addition, great forces develop when the boot toe is placed into the cramp, and the spur into the seat. These forces are transmitted through the support platform attachment assemblies. Emergency escape from the foot restraint is difficult since the spur engagement with the seat and a specific position of the foot in the cramp require certain efforts and time in order to remove the foot.

A work station device for performing space experiments (see "Engineering Psychology in Aviation and Cosmonautics," Achinostrojenie, 1972, pp. 224–225) is known to incorporate a frame in the form of rails, along which the astronaut's work place moves. This device is made in the form of a pressurized mounting capsule. The front part of the capsule incorporates a porthole for viewing and several outside remotely controlled manipulators. When performing work on the space vehicle surface, the capsule can be attached to the vehicle by outside rails.

The main disadvantage of such a device is that the astronaut remains inside the mounting capsule and is unable to quickly replace the samples being processed, move freely along the frame or around his axis. Moreover, the astronaut cannot quickly leave the work place in case of an emergency.

SUMMARY OF THE INVENTION

The invention is a work station device for performing experiments or other work in space which, due to the new design of a frame and an astronaut's mobile foot restraint, permits mounting the instrumentation and equipment, for instance, electron beam welding equipment, on the frame, and performing quick replacement of samples being processed. The astronaut in the work place has the capability of unrestrained displacement along the frame and around his axis with the ability of controlling his movement by means of handles with control push-buttons, and the capability of quickly leaving the sliding foot restraint in case of an emergency.

The work station device of this invention incorporates a frame and an astronaut's mobile foot restraint. The frame comprises a base connecting a rail along which the astronaut's sliding foot restraint slides on rollers, and a hand rail with a holder which has at least two seats fitted with latches for locking in a replaceable samples module, for example.

The astronaut's foot restraint preferably incorporates an upright post carrying displacement control push-buttons, a rotation control lever, and a handle for controlling the force of clamping the astronaut's feet. Rollers are provided for displacement over the rail and have gear rings which are kinematically connected through a system of tie-rods with the push-buttons. A rotary platform is mounted on the support bearing, the outer race of which carries a gear wheel which is kinematically connected by means of a spring-loaded lever and a system of tie-rods with the rotation control lever. The cramps for locking-in the astronaut's feet are mounted on the rotary platform and are kinematically connected to the handle on the post.

The cramps for locking-in the astronaut's feet are preferably made in the form of cranks with cylindrical springs. The cranks have an axis of rotation normal to the axis of rotation of the rotary platform.

The frame base and the hand rail are preferably connected to each other by means of at least two hinged joints with latches, the axles of which are made with an eccentricity for eliminating backlash in case of wear.

DETAILED DESCRIPTION OF THE INVENTION

Figure 1:
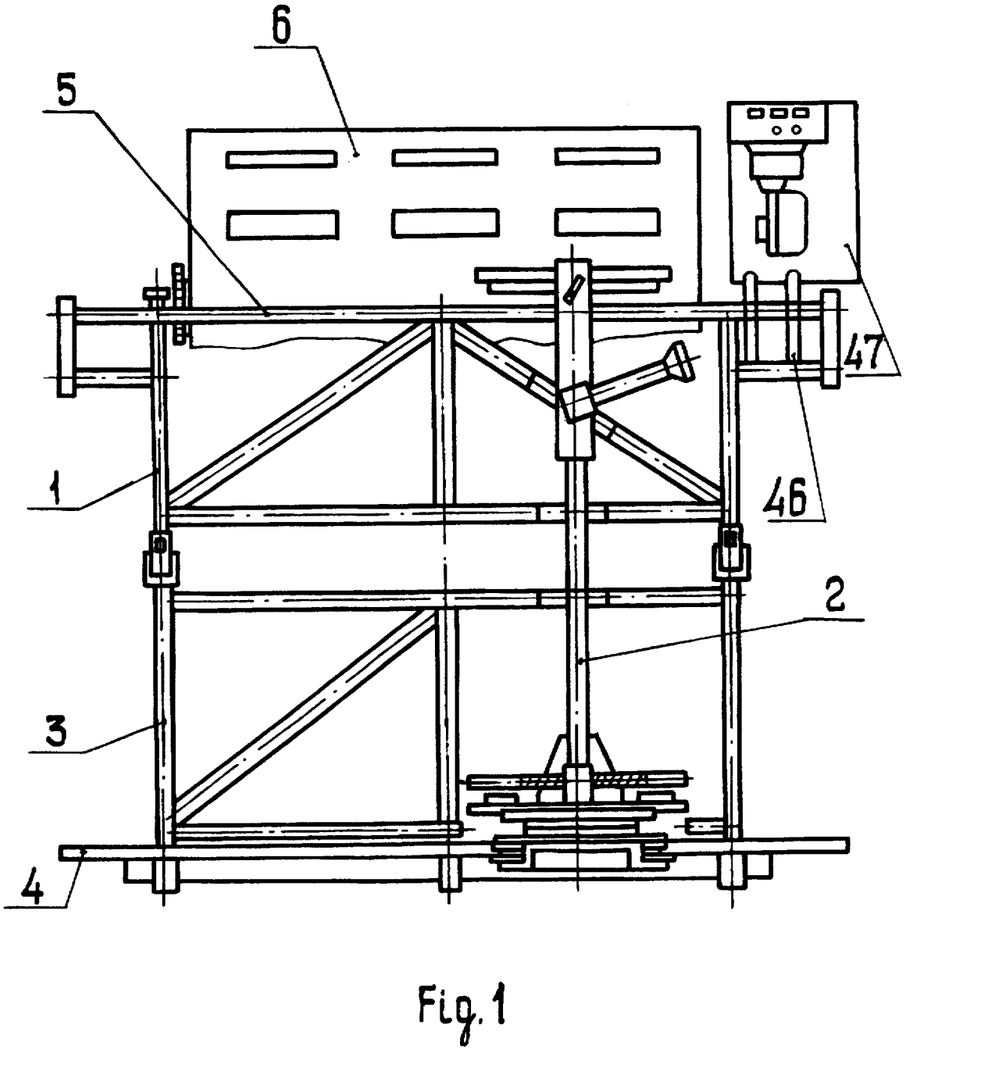
FIG. 1 a general view of a work station according to one embodiment of the present invention.
Figure 2:
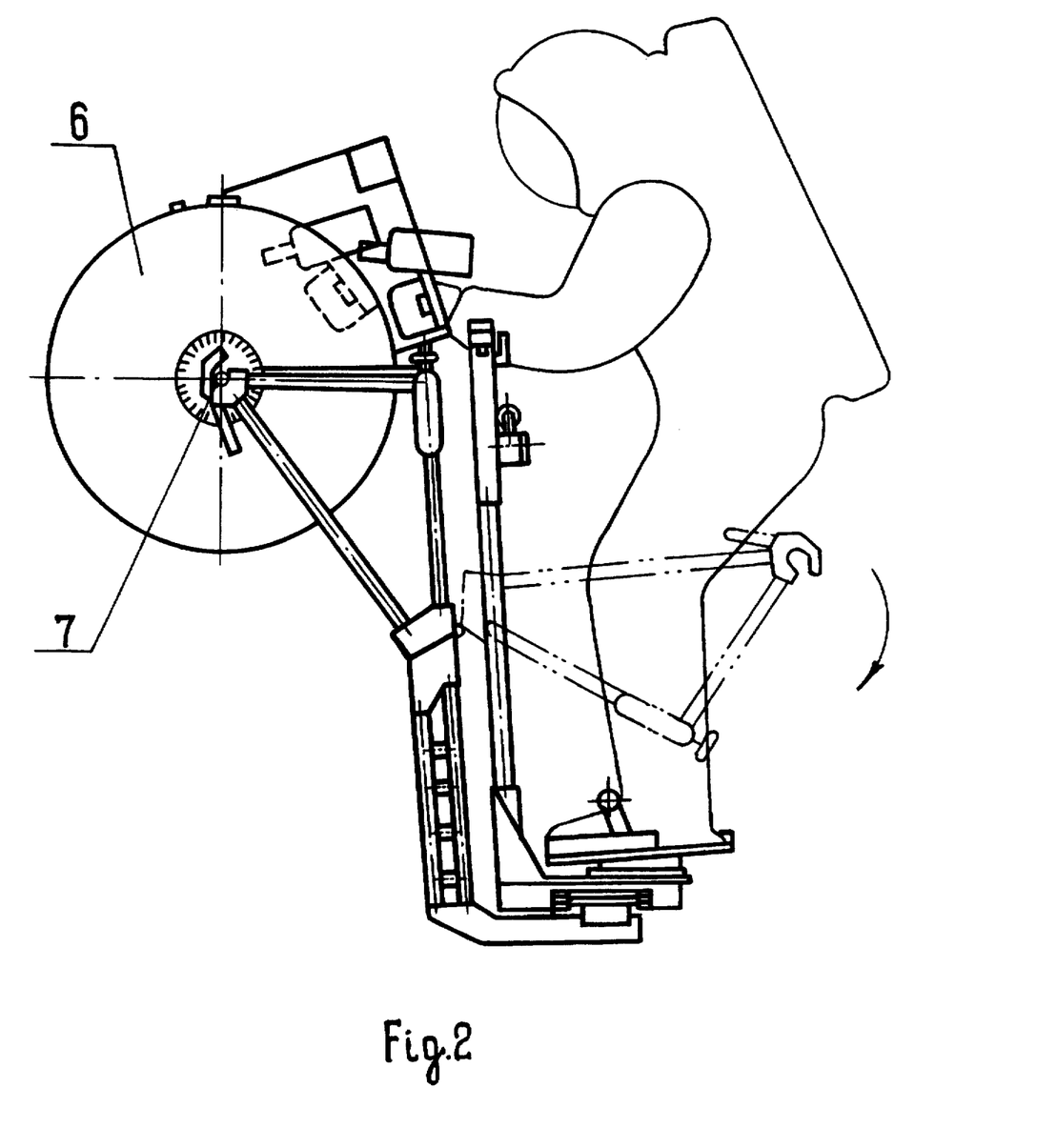
FIG. 2 is a side view of the work station of FIG. 1.
Figure 3:
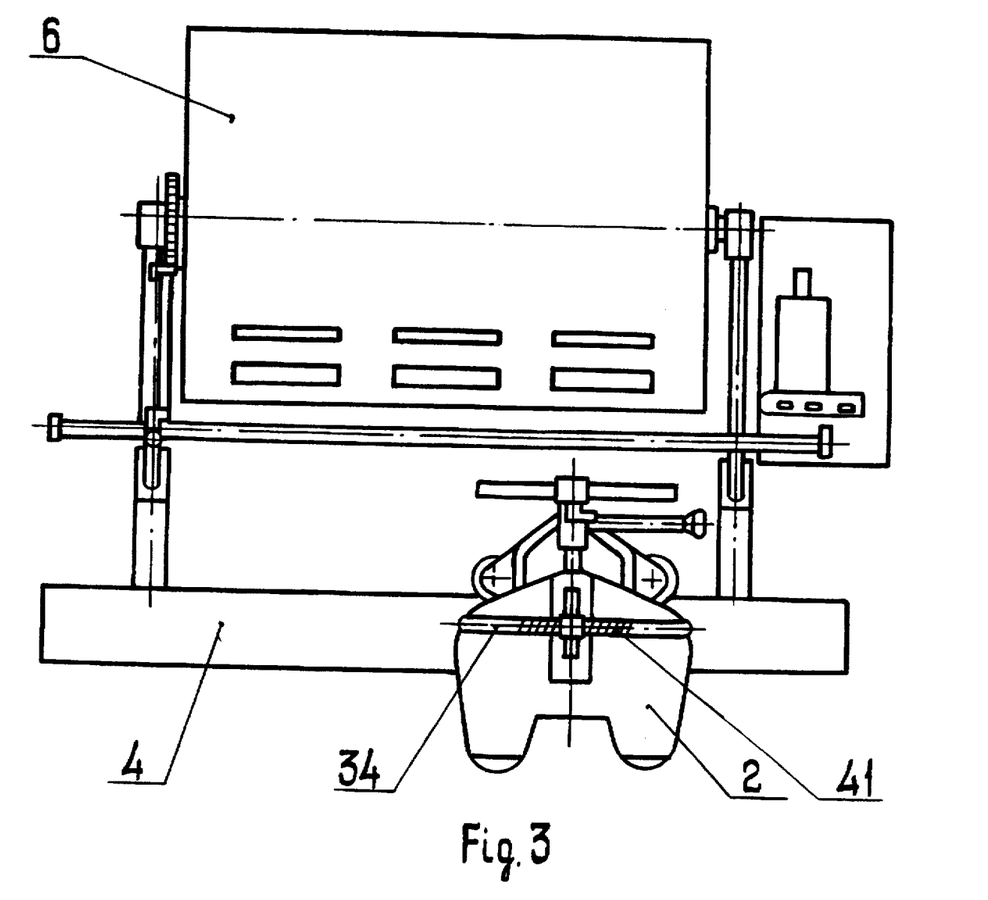
FIG. 3 is a top view of the work station of FIGS. 1 and 2.

The present work station device for performing experiments and other work in space has a frame 1 and an astronaut's sliding foot restraint 2 (FIG. 1–3).

The frame 1 includes base 3, rail 4 for displacement of the astronaut's sliding foot restraint 2 and hand rail 5.

The hand rail 5 incorporates at least two seats 7 for fastening replaceable sample modules 6.

Figure 4:
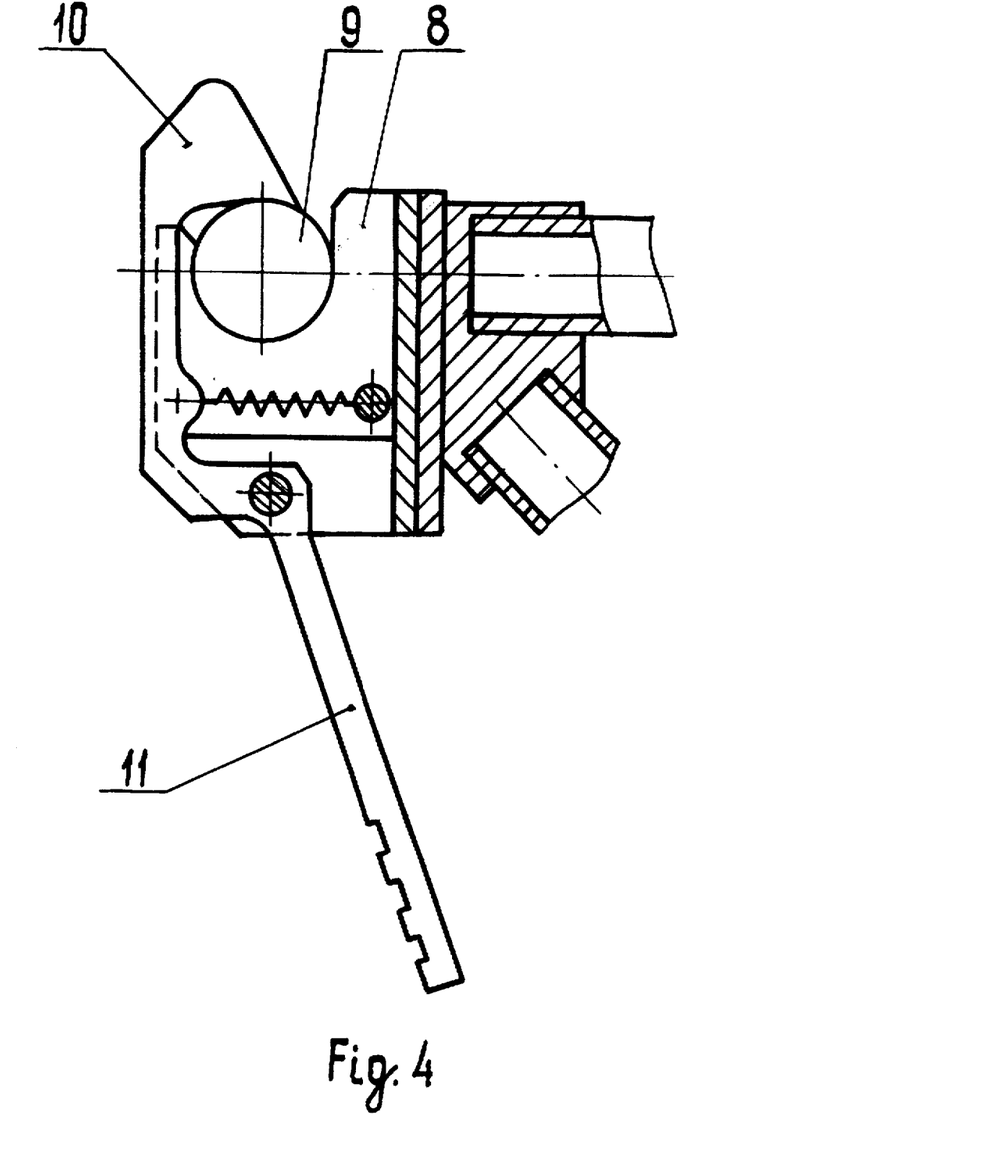
FIG. 4 illustrates a seat with a latch for locking-in a replaceable samples module.

The seat 7 (FIG. 4) includes support assembly 8 into which axle 9 of the replaceable samples module 6 is inserted and a spring-loaded latch 10 which prevents the axle 9 from leaving the support assembly 8 before the handle 11 has been pressed.

The replaceable samples module 6 (FIG. 5) incorporates gear wheel 12 which permits locking of the selected position of the replaceable samples module 6 by means of tie-rod 13 and handle 14 connected to spring-loaded tag 15.

The astronaut's sliding foot restraint 2 has an upright post 16 (FIG. 6) fitted with handle 17 with two push-buttons 18, lever 19 and lever 20.

Figure 6:
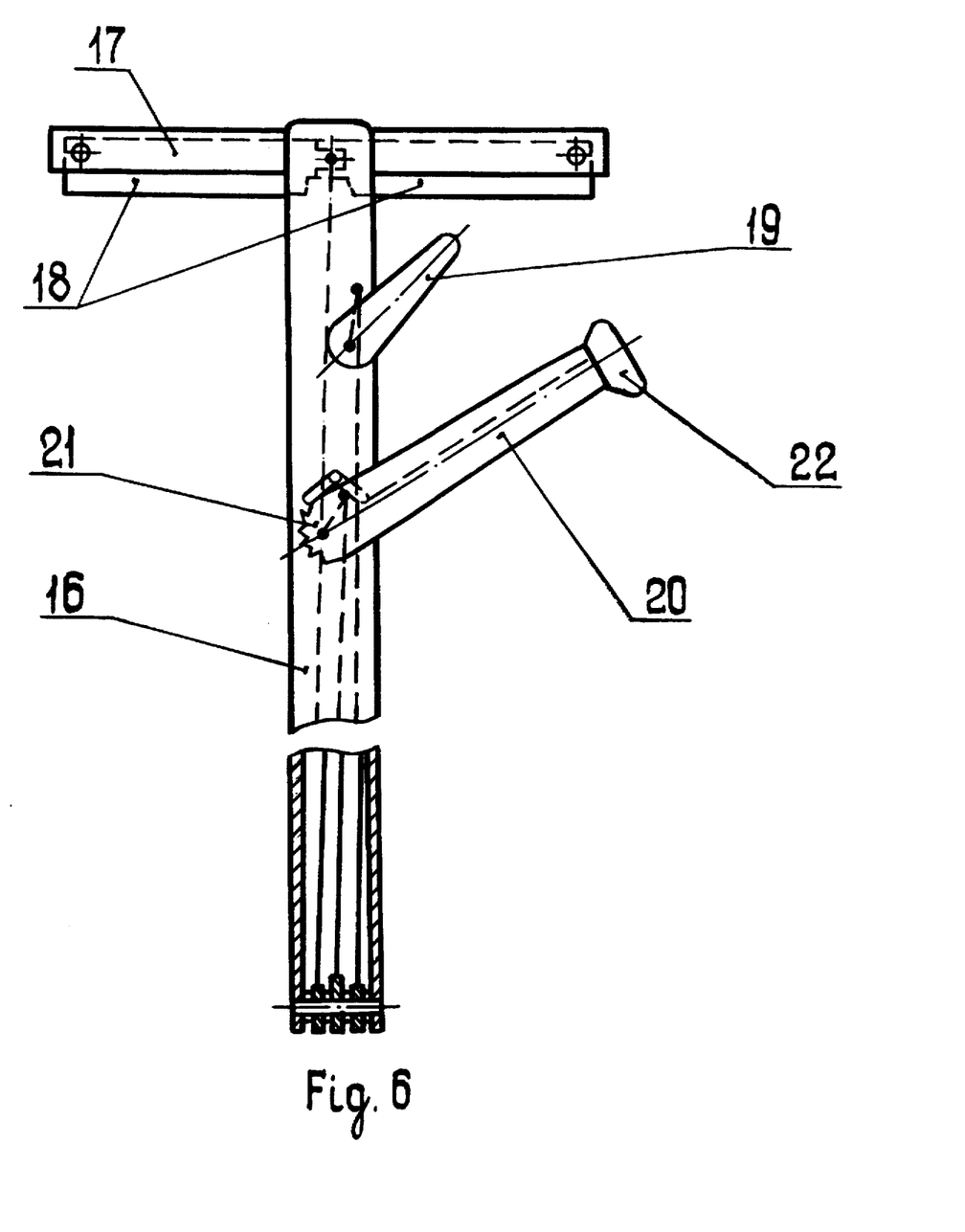
FIG. 6 shows an upright post of an astronaut's foot restraint with controls.

The push-buttons 18 control the astronaut's rotation around his vertical axis.

The lever 19 locks the astronaut's sliding foot restraint 2 on the rail 4.

The handle 20 controls the clamping of the astronaut's feet. The position of the handle 20 is adjustable by means of a ratchet-and-pawl mechanism 21 to change the force with which the astronaut's feet are clamped to the astronaut's sliding foot restraint 2. Push-button 22 unlocks the ratchet-and-pawl mechanism 21.

Figure 7:
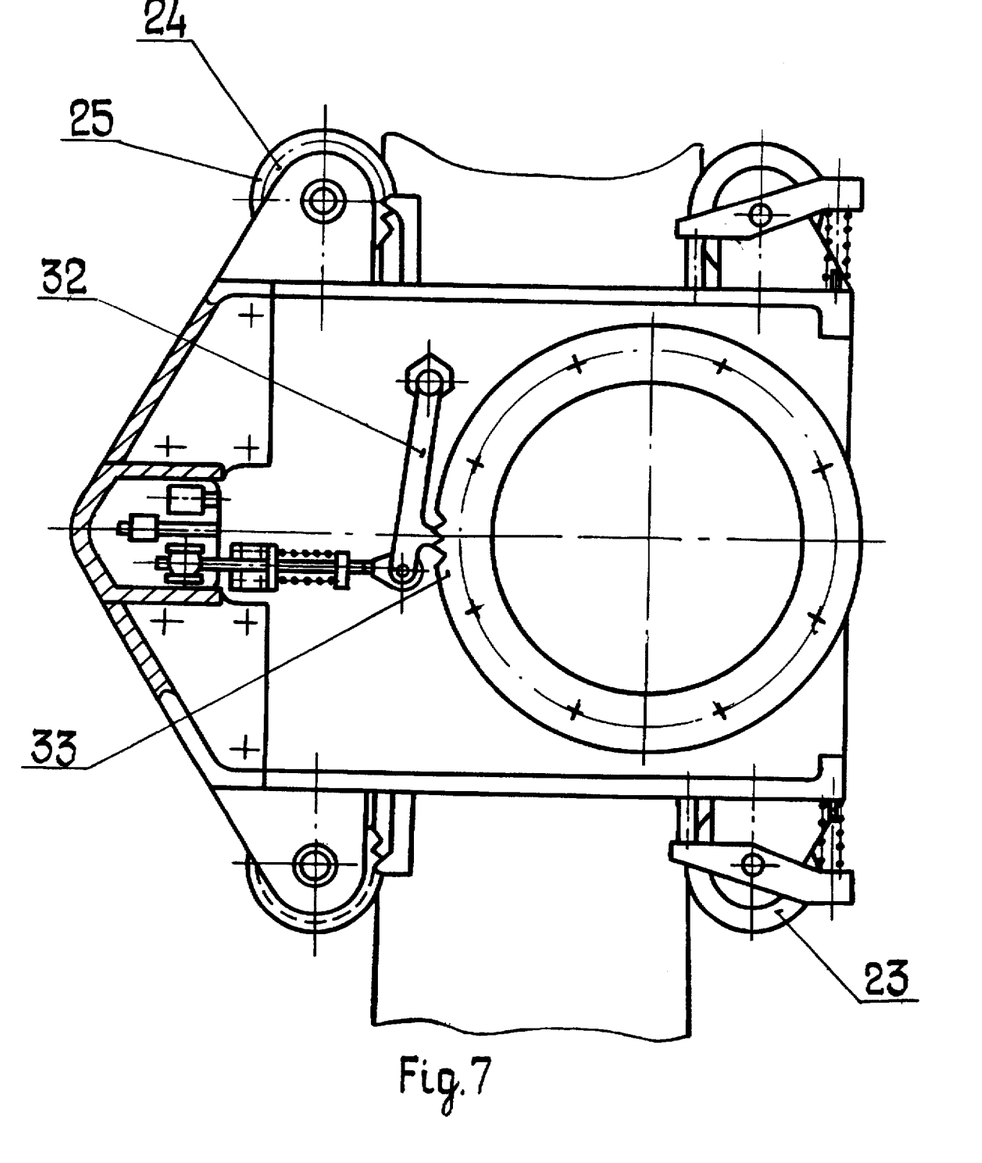
FIG. 7 a top view of the astronaut's foot restraint of FIG. 6.

The astronaut's sliding foot restraint 2 moves along the rail 4 on roller pairs 23 and 24 (FIG. 7).

The pair of rollers 23 located on one side of the rail 4 is spring-loaded. This permits taking out any backlash between the, rail 3 and the roller pairs 23 and 24. The rollers 24 are fitted with gear rings 25 which interact with spring-loaded levers 26 (FIG. 8) to stop and lock-in the astronaut's sliding foot restraint 2 in the desired position along the rail 4. Locking-in takes place when a tooth of the lever 26 is in engagement with the ring 25 under the action of the spring 27. Control of the levers 26 is performed by tie-rod 28 through lever 29 and further by the control lever 19.

Turning of platform 30 (FIG. 9) is performed by means of support bearing 31. Locking-in of the platform 30 in the position required for the astronaut is performed by spring-loaded lever 32 (FIG. 7) and gear ring 33 located on an outside race of the bearing 31. Rotation of the platform 30 is controlled by the push-buttons 18 in a manner similar to the levers 26 and 19.

Figure 9:
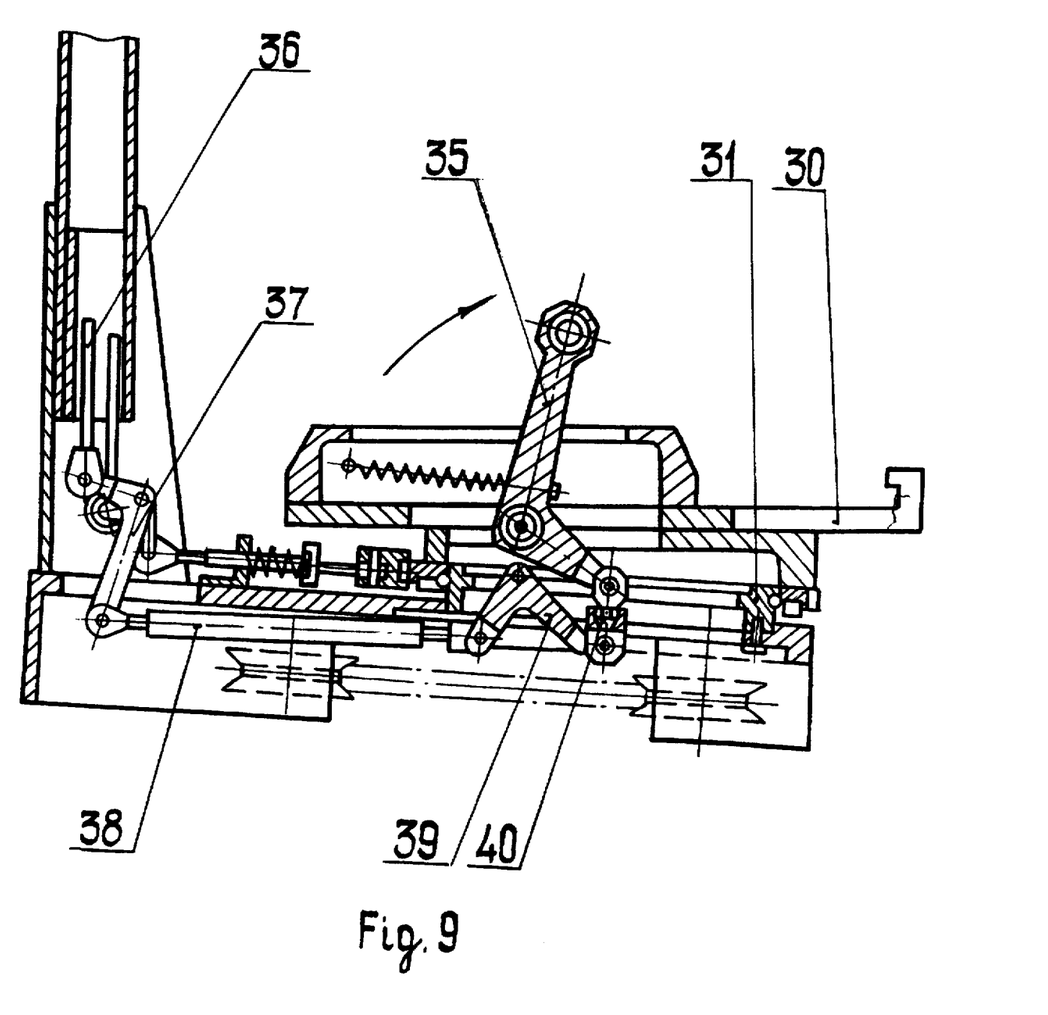
FIG. 9 is a sectional view of the astronaut's mobile foot restraint of FIGS. 6–8.

In order to ensure fastening of the astronaut's feet in the sliding foot restraint 2, the platform 30 is fitted with locking cramps 34 made in the form of cranks (FIG. 3) which are mounted on rockable lever 35 (FIG. 9). When the lever 35 is turned in the direction of the arrow (FIG. 9), the locking cramps 34 clamp the astronaut's feet to the upper surface of the platform 30. The lever 35 is actuated by tie-rod 36, lever 37, tie-rod 38, and lever 39 with spherical bearing 40, the axis of which coincides with the axis of rotation of the platform 30. The tie-rod 36 is controlled by handle 20 with the ratchet-and-pawl mechanism 21 located on the upright post 16 of the astronaut's sliding foot restraint 2.

The locking cramp 34 made in the form of a crank, has a transverse portion with the cylindrical spring 41 (FIG. 3). The stiffness of the spring 41 is selected in such a way that the astronaut's feet are clamped to the platform 30 of the astronaut's sliding foot restraint 2 with a force sufficient for performance of all the operations. If during operation the device develops a malfunction and the astronaut is not able to open the cramps 34 to leave the sliding foot restraint 2, the springs 41 permit emergency unlocking of the astronaut's feet.

Figure 10:
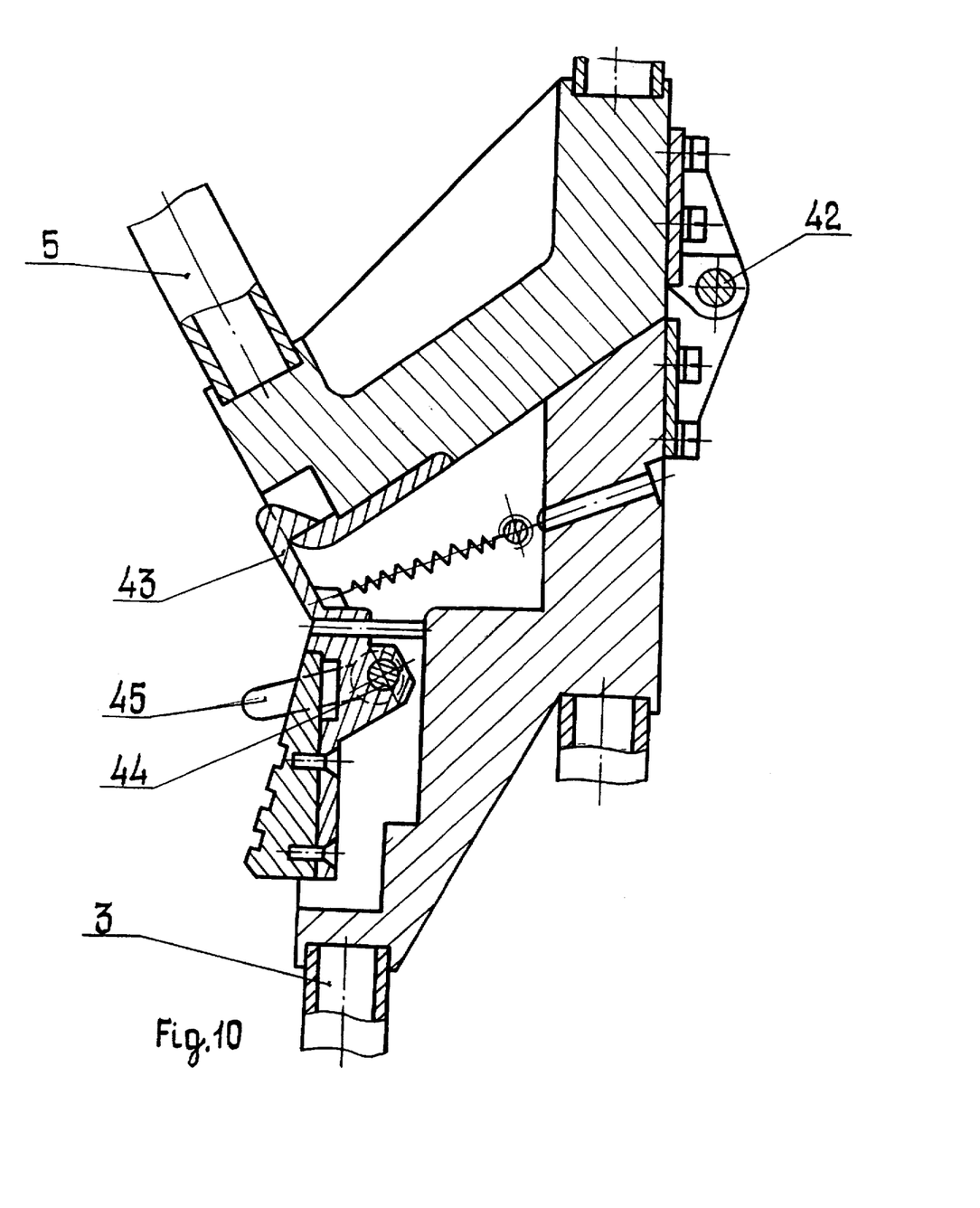
FIG. 10 illustrates a connection of the hand rail and the frame base in the work station of FIG. 1.

The base 3 and the hand rail 5 of the frame 1 are connected by hinges (FIG. 10). When turning around axle 42, spring-loaded latch 43 locks the hand rail 5 in the working position. The latch 43 is mounted on eccentric axle 44 which permits, by turning handle 45, to take up any backlash after the hand rail 5 has been moved into the working position.

Bracket 46 (FIG. 1) attached to the hand rail 5 is designed for mounting thereon a block of process hardware 47, for example.

Depending on the purposes of the experiment, the work station is either mounted in the cargo bay of the Shuttle, or is taken out in a transportation position and mounted in the working position of an outer surface of a space station of the MIR type.

The process of taking out the work station for performing experiments or other work in space is as follows.

Figure 8:
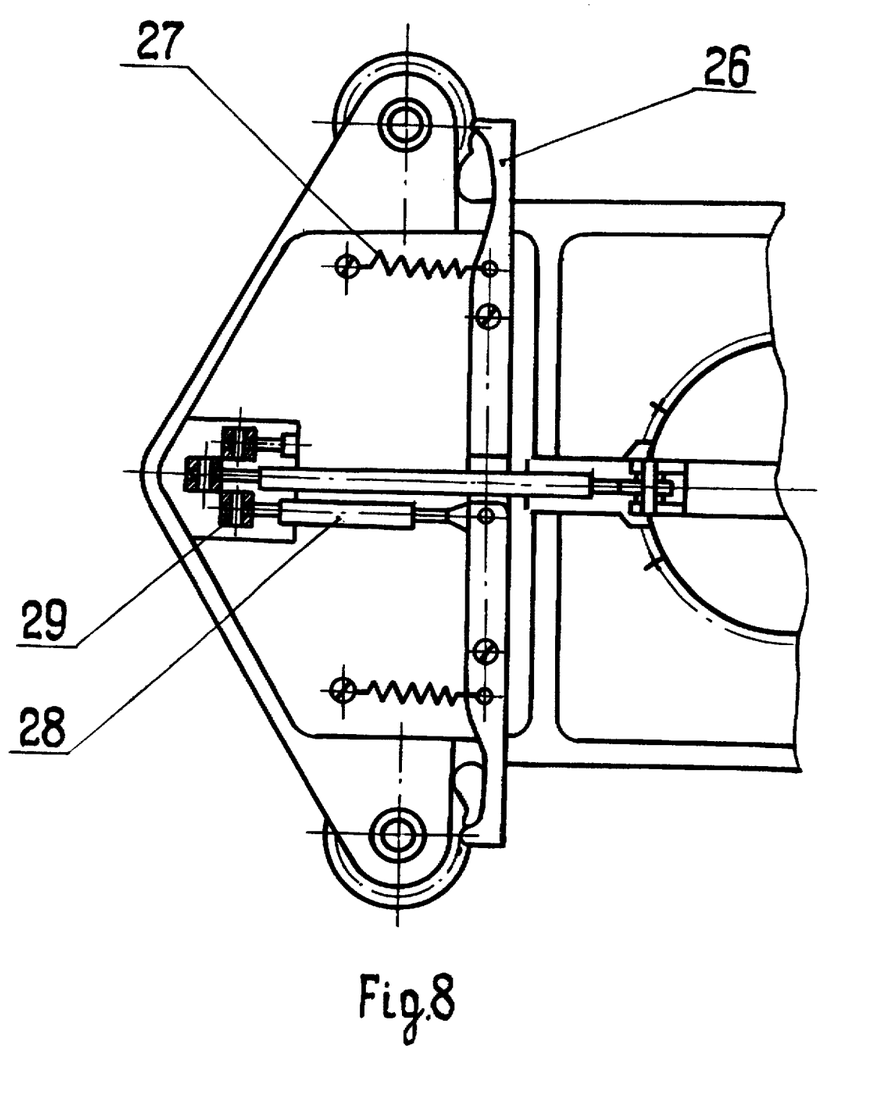
FIG. 8 is a bottom view of the astronaut's foot restraint of FIGS. 6 and 7.

The frame 1 is taken out in the folded condition with the astronaut's sliding foot restraint 2 removed from the rail 3. Here, the hand rail 4 should be folded around the axles 42. The replaceable samples module 6 and the process hardware 47 should also be removed. After the work station has been mounted in the fastening seats, the hand rail 4 is lifted and locked-in by means of the spring-loaded latch 43 which is then tightened by means of the lever 45 and the eccentric axle 44 (FIG. 10). The replaceable samples module 6 (FIG. 4) is mounted in the seats 8 by means of the spring-loaded tags 10 which lock it and prevent it from falling out. The process hardware block 47 is mounted on the bracket 46. The astronaut's sliding foot restraint 2 can be rolled onto the rail 3 from either end. Here, it is necessary to first disengage the levers 26 and the gear rings 25 of the rollers 24 by means of the handle 19 (FIG. 8). After rolling the astronaut's sliding foot restraint 2 onto the rail 3, it is locked-in by means of the handle 19.

The work station operates in the following manner for performing experiments or other work in space.

Figure 5:
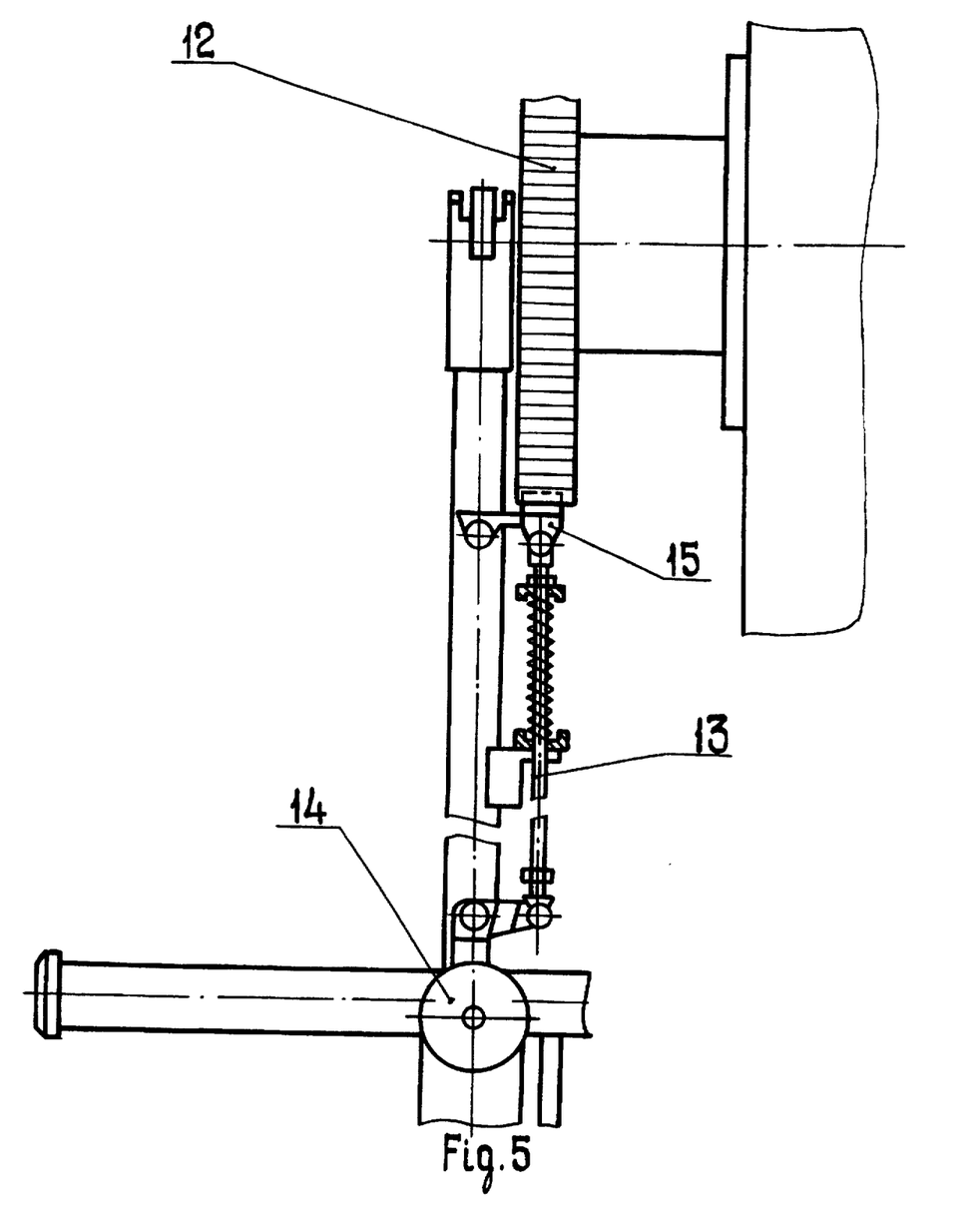
FIG. 5 illustrates a gear wheel of the replaceable samples module with a tab brake.

In order to select the most convenient position of the replaceable samples module 6, the operator brings out of engagement the tag 15 and the gear wheel 12 by means of the handle 14 and rotates the replaceable samples module 6 (FIG. 5). When the replaceable samples module 6 is in the desired position, the handle 14 is released to engage the tag 15 in the gear wheel 12.

The astronaut's mobile foot restraint 2 moves along the working envelope over the rail 3 on the rollers 23 and 24 (Fig. 7). The pair of rollers 23 located on one side of the rail 3 is spring-loaded to take up any backlash between the rail 3 and the sliding foot restraint 2, and facilitates smooth travel along the rail 3. In order to provide stopping and locking of the mobile foot restraint 2 in the required position, the second pair of rollers 24 (FIG. 8) is fitted with the gear rings 25 which interact with the spring-loaded levers 26. Braking takes place when the tooth of the lever 26 is in engagement with the ring 25 of the roller 24 under the action of the spring 27. The levers 26 are controlled by the tie-rod 28 through the lever 29 and further to the post 16 with the controls, by means of the lever 19. The lever 19 has two positions: braking (normal position) and free travel (by moving the lever 19).

Turning of the platform 30 (FIG. 9) of the astronaut's sliding foot restraint 2 is performed by means of the bearing 31. Locking of the platform 30 in the position required for the astronaut is performed by the spring-loaded lever 32 (FIG. 7) and the gear ring 33 located on the outer race of the bearing 31. Turning of the platform 30 of the astronaut's mobile foot restraint 2 is controlled by two push-buttons 18 on the handle 17 of the sliding foot restraint 2, which duplicate each other. When either of the push-buttons 18 is pressed, the platform 30 can be rotated on the bearing 31 and the astronaut can use the handle 17 for leverage.

In order to ensure fastening of the astronaut's feet in the sliding foot restraint 2, the rotary platform 30 is fitted with the cramps 34 made in the form of cranks (FIG. 3), which are attached to the rockable lever 35 (FIG. 9). When the lever 35 is turned in the direction of the arrow (FIG. 9), the cramps 34 clamp the astronaut's feet to the plane of the platform 30. The lever 35 is actuated by the tie-rod 36, lever 37, tie-rod 38, lever 39 and the spherical bearing 40, the axis of which coincides with the axis of rotation of the platform 30. The tie-rod 36 is controlled by the handle 20 located on the post 16 of the astronaut's sliding foot restraint 2, the position of the handle 20 and the cramp 34 being adjusted by the ratchet-and-pawl mechanism 21, which permits changing the force with which the astronaut's feet are pressed against the platform 30.

The cramp 34 has a section made with the cylindrical spring 41 (FIG. 3). The stiffness of the spring 41 is selected in such a way that the astronaut's feet are pressed to the platform 30 with a force sufficient for him to perform all the desired operations. If during operation the device develops a malfunction and the astronaut is not able to open the cramps in order to leave the mobile foot restraint, the springs 41 permit an emergency unlocking of the astronaut's feet.

While the invention has been described in terms of its preferred embodiments, those skilled in the art will recognize that the invention can be practiced with considerable variation within the scope and spirit of the appended claims.

We claim:

1. An astronaut's work station device for performing experiments in space, comprising:

a frame having a base connecting a foot rail and a hand rail;

assemblies for fastening a replaceable samples module located on the hand rail;

an astronaut's mobile foot restraint slideable along the foot rail.

2. The device of claim 1, wherein the frame is made foldable and comprises:

at least two hinged joints between the hand rail and the base;

latch locks for the hinged joints, axles of which are made with an eccentricity for taking up any backlash after wear.

3. The device of claim 1, wherein the frame comprises at least two seats for fastening the replaceable samples module with controllable latches for locking-in the replaceable samples module, and the replaceable samples module has a gear wheel which interacts with a spring-loaded tag for locking-in of the replaceable samples module in a rotated position.

4. The device of claim 1, wherein the astronaut's mobile foot restraint has rollers in engagement with gear rings which interact with spring-loaded levers for locking of the astronaut's mobile foot restraint in any position along the rail.

5. The device of claim 4, wherein:

the astronaut's mobile foot restraint has a platform rotatable around the astronaut's vertical axis; and the platform has a gear wheel which interacts with a spring-loaded locking lever.

6. The device of claim 5, wherein:

cramps for clamping the astronaut's feet are mounted on the platform and are made in the form of a cylindrical spring to facilitate fast unlocking of the astronaut's feet in case of an emergency.

7. The device of claim 6, wherein the astronaut's mobile foot restraint has an upright post having mounted thereon a handle with transverse push-buttons for controlling the platform locking levers for rotational locking of the astronaut's mobile foot restraint, a transverse lever with a ratchet-and-pawl mechanism for controlling the cramps, and an upright lever for controlling locking of the rollers along the rail.

* * * * *